(12) United States Patent
Lopez (10) Patent No.: US 7,377,475 B1
(45) Date of Patent: May 27, 2008

(54) TELEVISION MOUNT ASSEMBLY

(76) Inventor: Rodovaldo Lopez, 1624 NE. 2nd Ter., Cape Coral, FL (US) 33909

( * ) Notice: Subject to any disclaimer, the term of this patent is extended or adjusted under 35 U.S.C. 154(b) by 205 days.

(21) Appl. No.: 11/186,375

(22) Filed: Jul. 22, 2005

(51) Int. Cl.
*A47H 1/10* (2006.01)

(52) U.S. Cl. ............ 248/323; 248/917; 248/919; 248/920; 248/921; 248/922; 248/317; 248/323; 248/324; 105/29.1; 105/29.2

(58) Field of Classification Search .......... 248/917, 248/919, 920, 921, 922, 317, 323, 324; 362/648, 362/391, 406; 105/29.1, 29.2
See application file for complete search history.

(56) References Cited

U.S. PATENT DOCUMENTS

| | | | | |
|---|---|---|---|---|
| 2,785,597 | A * | 3/1957 | Gerard | 352/140 |
| 2,986,366 | A * | 5/1961 | Wesson | 248/285.1 |
| 3,577,930 | A * | 5/1971 | Rooklyn | 104/173.1 |
| 3,662,981 | A * | 5/1972 | Hogrebe | 248/278.1 |
| 3,889,910 | A * | 6/1975 | Walters | 248/122.1 |
| 3,908,942 | A * | 9/1975 | Keith et al. | 248/158 |
| 3,911,221 | A * | 10/1975 | Wong | 381/387 |
| 4,310,136 | A * | 1/1982 | Mooney | 248/278.1 |
| 4,644,873 | A * | 2/1987 | Uttscheid | 105/29.1 |
| 4,817,903 | A | 4/1989 | Braehler et al. | |
| 4,836,478 | A * | 6/1989 | Sweere | 248/279.1 |
| 4,868,845 | A * | 9/1989 | Koropp | 378/204 |
| 4,959,645 | A * | 9/1990 | Balz | 340/825.72 |
| 4,964,606 | A * | 10/1990 | Beam et al. | 248/333 |
| 4,993,676 | A * | 2/1991 | Fitts et al. | 248/317 |
| 5,027,712 | A * | 7/1991 | Wallick | 104/94 |
| 5,127,617 | A * | 7/1992 | Bergetz | 248/278.1 |
| 5,139,223 | A * | 8/1992 | Sedighzadeh | 248/324 |
| 5,160,104 | A * | 11/1992 | Sher | 248/176.1 |
| 5,379,977 | A * | 1/1995 | Ronn et al. | 248/277.1 |
| 5,393,025 | A * | 2/1995 | Franklin | 248/277.1 |
| 5,400,993 | A * | 3/1995 | Hamilton | 248/279.1 |
| 5,405,117 | A * | 4/1995 | Davis | 248/333 |
| 5,419,260 | A * | 5/1995 | Hamilton | 104/89 |
| 5,433,414 | A * | 7/1995 | Vieira | 248/316.4 |
| 5,450,800 | A | 9/1995 | Leonard | |
| 5,479,862 | A * | 1/1996 | Waterkamp | 104/93 |
| 5,487,524 | A * | 1/1996 | Bergetz | 248/613 |
| 5,634,622 | A | 6/1997 | Pye | |
| 5,738,316 | A * | 4/1998 | Sweere et al. | 248/123.11 |
| 5,797,568 | A * | 8/1998 | Canton Gongora et al. | 248/122.1 |
| D409,992 | S | 5/1999 | Mockett | |
| 5,927,668 | A * | 7/1999 | Cyrell | 248/317 |
| 5,941,492 | A * | 8/1999 | O'Neill | 248/317 |

(Continued)

*Primary Examiner*—Carl D. Friedman
*Assistant Examiner*—Nkeisha J. Dumas (57) ABSTRACT

A television mount assembly includes an elongated railing has a first end and second end. The railing is attached to a ceiling with a plurality of brackets. A pole has a top end and a bottom end. The pole has a pair of bends therein so that the pole includes a first arm, a second arm and a middle section extending between the first and second arms. A mounting is attached to the top end and secures the pole to the railing. The pole is movable along the railing. A first motor is mounted on the pole and a drive wheel is mechanically coupled to the motor. The drive wheel is in communication with the railing. The first motor is configured to selectively rotate the drive wheel in a first direction or a second direction so that the top end of the pole is moved along the railing.

7 Claims, 9 Drawing Sheets

U.S. PATENT DOCUMENTS

| | | | |
|---|---|---|---|
| 6,095,476 A * | 8/2000 | Mathis | 248/422 |
| 6,149,253 A | 11/2000 | Talasani | |
| 6,158,704 A * | 12/2000 | O'Neill | 248/317 |
| 6,454,234 B1 * | 9/2002 | Westbrook | 248/317 |
| 6,633,276 B1 * | 10/2003 | Jaynes | 345/158 |
| 6,655,645 B1 * | 12/2003 | Lu et al. | 248/176.1 |
| 6,659,777 B1 * | 12/2003 | Rondeau | 434/416 |
| 6,739,096 B2 * | 5/2004 | Feldpausch et al. | 52/36.1 |
| 6,896,233 B2 * | 5/2005 | Kuhn | 248/323 |
| 2002/0194792 A1 | 12/2002 | Feldpausch et al. | |
| 2006/0284034 A1 * | 12/2006 | Takaji et al. | 248/131 |

* cited by examiner

TELEVISION MOUNT ASSEMBLY

BACKGROUND OF THE INVENTION

1. Field of the Invention

The present invention relates to television mount devices and more particularly pertains to a new television mount device for suspending a television from a ceiling and for allowing selective movement of the television along the ceiling.

2. Description of the Prior Art

The use of television mount devices is known in the prior art. U.S. Pat. No. 4,817,903 describes a similar device for holding a data processing device that is configured to selective move the data processing device horizontally or vertically. Another type of television mount device is U.S. patent Appl. No. 2002/0194792 having an elongated pole which is suspended from a horizontal support and which has a mount configured to hold one or more display screens. The pole is selectively movable along the horizontal support. A television-viewing stand that may be controlled by a remote control is shown in U.S. Pat. No. 5,634,622.

While these devices fulfill their respective, particular objectives and requirements, the need remains for a device for supporting a television from a ceiling. The device should be adapted for moving the television within a room and also adapted for selectively rotating the television to a desired angle with respect to a viewer of the television.

SUMMARY OF THE INVENTION

The present invention meets the needs presented above by comprising an elongated railing having a first end and second end. The railing includes a tube has a top wall, a bottom wall, a first side wall and second side wall. The top wall has a slot therein extending along a length thereof. The railing has at least one bend therein. A track is attached to and extends along a length of the first side wall. Each of a plurality of brackets is attached to the railing and each extends upwardly therefrom. Each of the brackets is attached to a ceiling. A pole has a top end and a bottom end. The pole has a pair of bends therein so that the pole includes a first arm, a second arm and a middle section extending between the first and second arms. The first and second arms extend in a same direction with respect to each other. A mounting is attached to the top end. The mounting has a bend therein and a leg is defined extending downwardly from a horizontal portion of the mounting. The leg extends through the slot. A wheel is rotatably mounted to the leg and is positioned within the tube. The wheel is rotatable along the bottom and top walls. A first motor is mounted on the pole adjacent to the top end. A drive wheel is mechanically coupled to the motor. The drive wheel is in communication with the railing. The motor is configured to selectively rotate the drive wheel in a first direction or a second direction so that the top end of the pole is moved along the railing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 10 thereof, a new television mount device embodying the principles and concepts of the present invention and generally designated by the reference numeral 10 will be described.

As best illustrated in FIGS. 1 through 10, the television mount assembly 10 generally comprises an elongated railing 12 that has a first end 13 and second end 14. The railing 12 includes a tube having a top wall 15, a bottom wall 16, a first side wall 18 and second side wall 19. The top wall 15 has a slot 20 therein extending along a length thereof. A flange 21 is attached to and extends along and outwardly from the first side wall 18. The railing 12 has at least one bend 22 therein. A track 24 is attached to and extends along a length of the first side wall 18.

A plurality of brackets 25 is provided. Each of the brackets 25 is attached to the railing 12 and extends upwardly therefrom. Each of the brackets 25 is attached to a ceiling 26.

A pole 30 has a top end 31 and a bottom end 32. The pole 30 has a pair of bends 33 therein so that the pole includes a first arm 34, a second arm 35 and a middle section 36 extending between the first 34 and second 35 arms. The first 34 and second 35 arms extend in a same direction with respect to each other. A mounting 37 is attached to the top end 31. The mounting 37 has a bend 38 therein and a leg 39 is defined that extends downwardly from a horizontal portion of the mounting 37. The leg 39 extends through the slot 20. At least one wheel 40, and preferably a plurality of wheels 40, is rotatably mounted to the leg 39 and is positioned within the tube, or railing 12. The wheel 40 is rotatable along the bottom 16 and top 15 walls. The middle section 36 is selectively telescoping and includes an inner portion 41 selectively movable inwardly or outwardly from an outer portion 42.

A first motor 44 is mounted on the pole 30 adjacent to the top end 31. A drive wheel 45 is mechanically coupled to the first motor 44. The drive wheel 45 is in communication with the railing 12, and more particularly engages the track 24. The first motor 44 is configured to selectively rotate the drive wheel 45 in a first direction or a second direction so that the top end 31 of the pole 30 is moved along the railing 12.

A panel 46 is rotatably mounted on the second arm 35 adjacent to the bottom end 32. The panel 46 is horizontally orientated and has a television 8 positioned thereon. A second motor 47 is mounted on the pole 30 adjacent to the bottom end 32. The second motor 47 is mechanically coupled to the panel 46. The second motor 47 is configured to selectively rotate the panel 46 in a first direction or a second direction.

A telescoping motor 50 is mounted on the pole 30 and is positioned on an end of the middle section 36. A rod 51 is coupled to the telescoping motor 50 and is threadably coupled to the inner portion 41. The telescoping motor 50 is configured to selectively rotate the rod 51 so that the inner portion 41 is selectively moved upwardly or downwardly with respect to the outer portion 42.

A control 60 is configured to selectively turn on each of the first 44, second 47 and telescoping 50 motors in a first direction or a second direction. The control 60 is preferably a wireless control.

Figure 1:
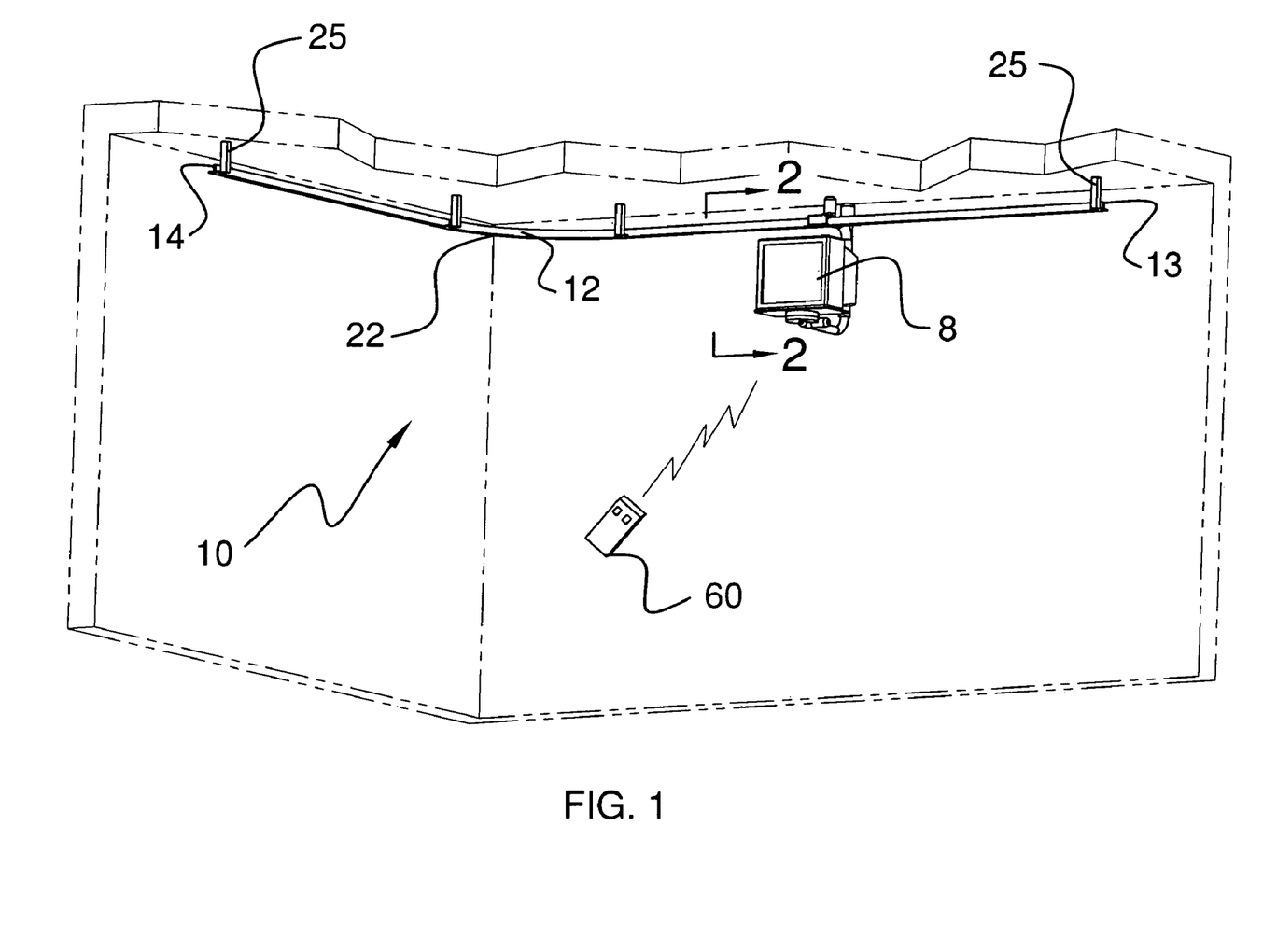
FIG. 1 is a perspective view of a television mount assembly according to the present invention.
Figure 2:
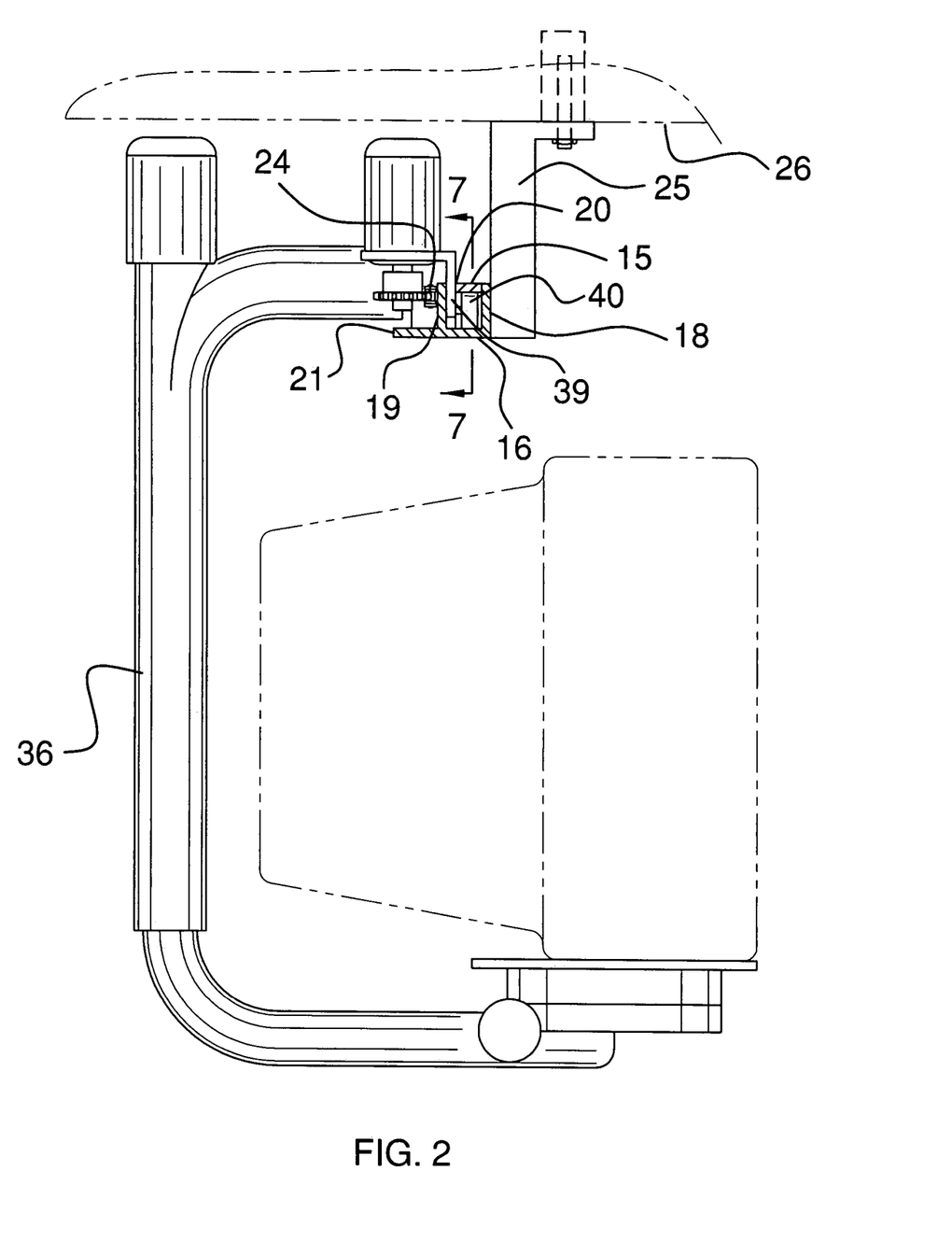
FIG. 2 is a side view taken along line 2-2 of FIG. 1 of the present invention.
Figure 3:
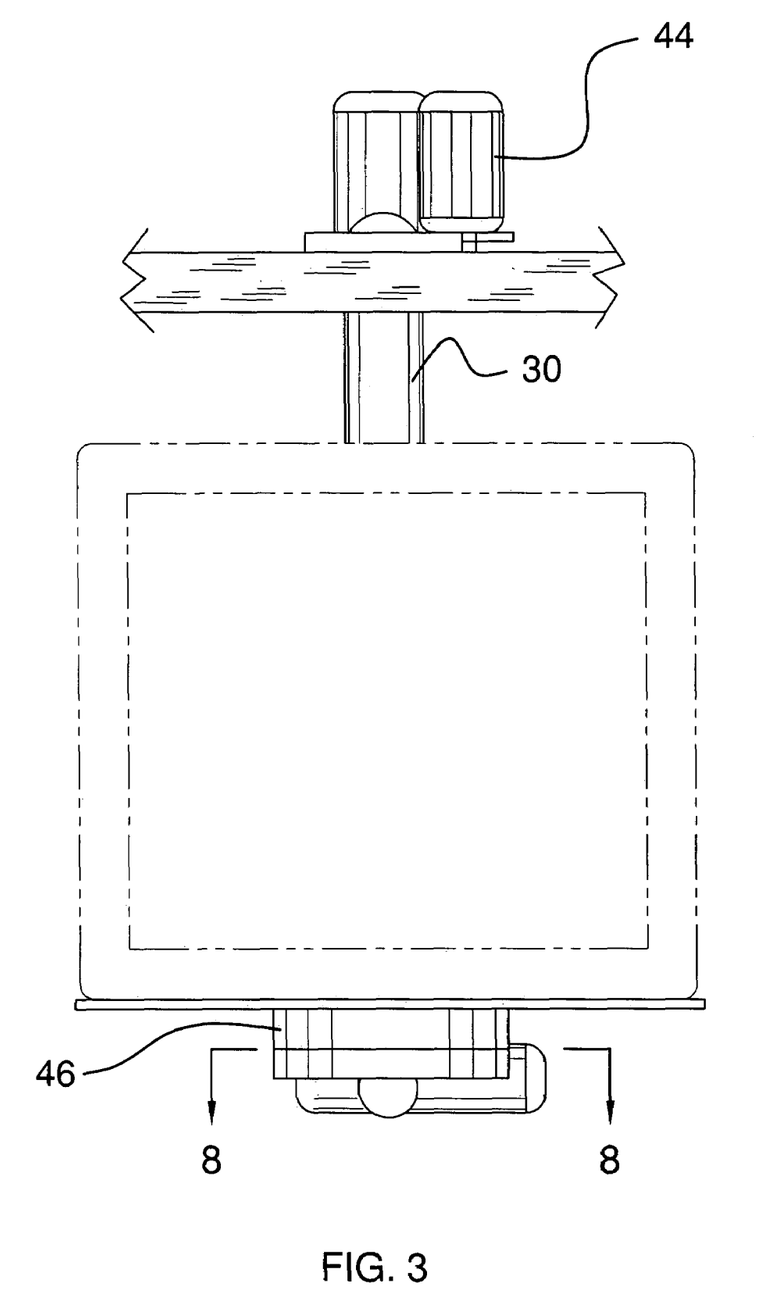
FIG. 3 is a front view of the present invention.
Figure 4:
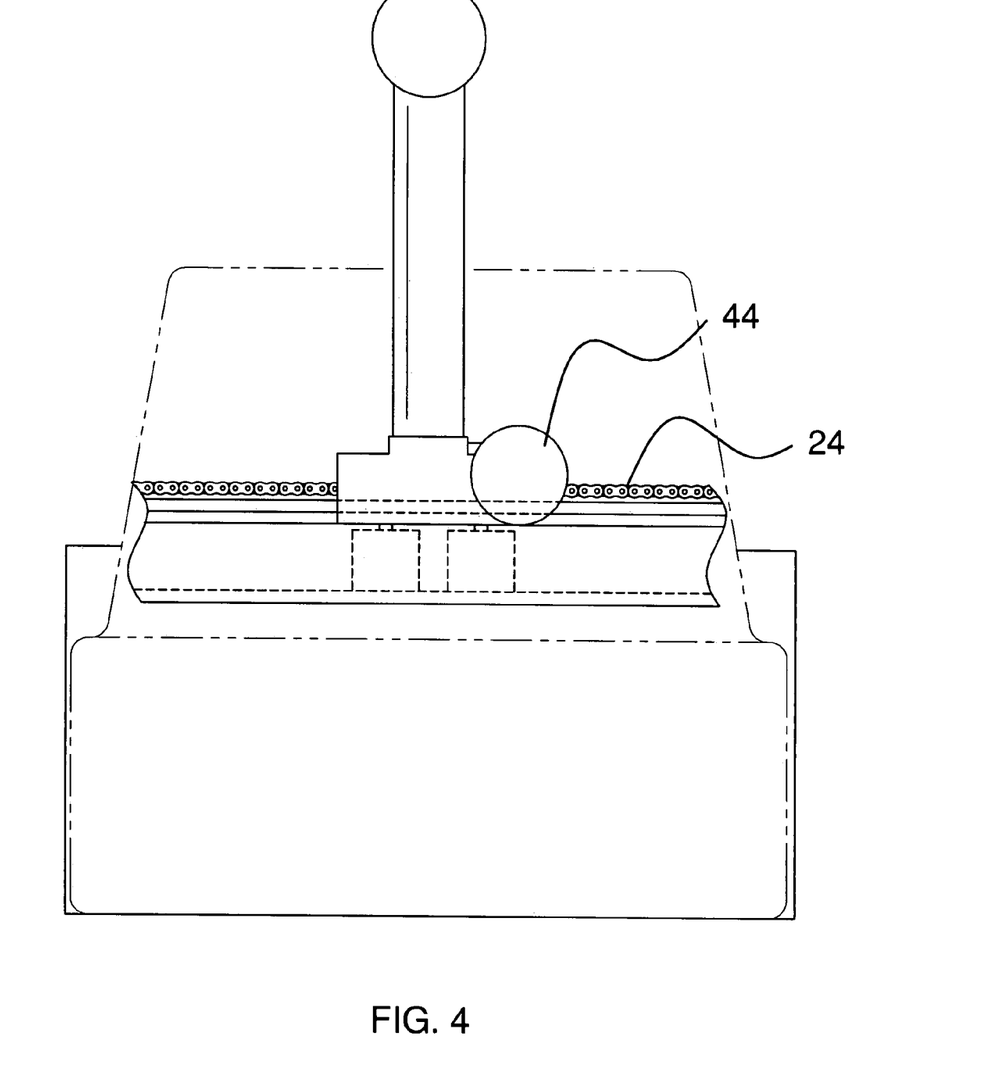
FIG. 4 is a top view of the present invention.
Figure 5:
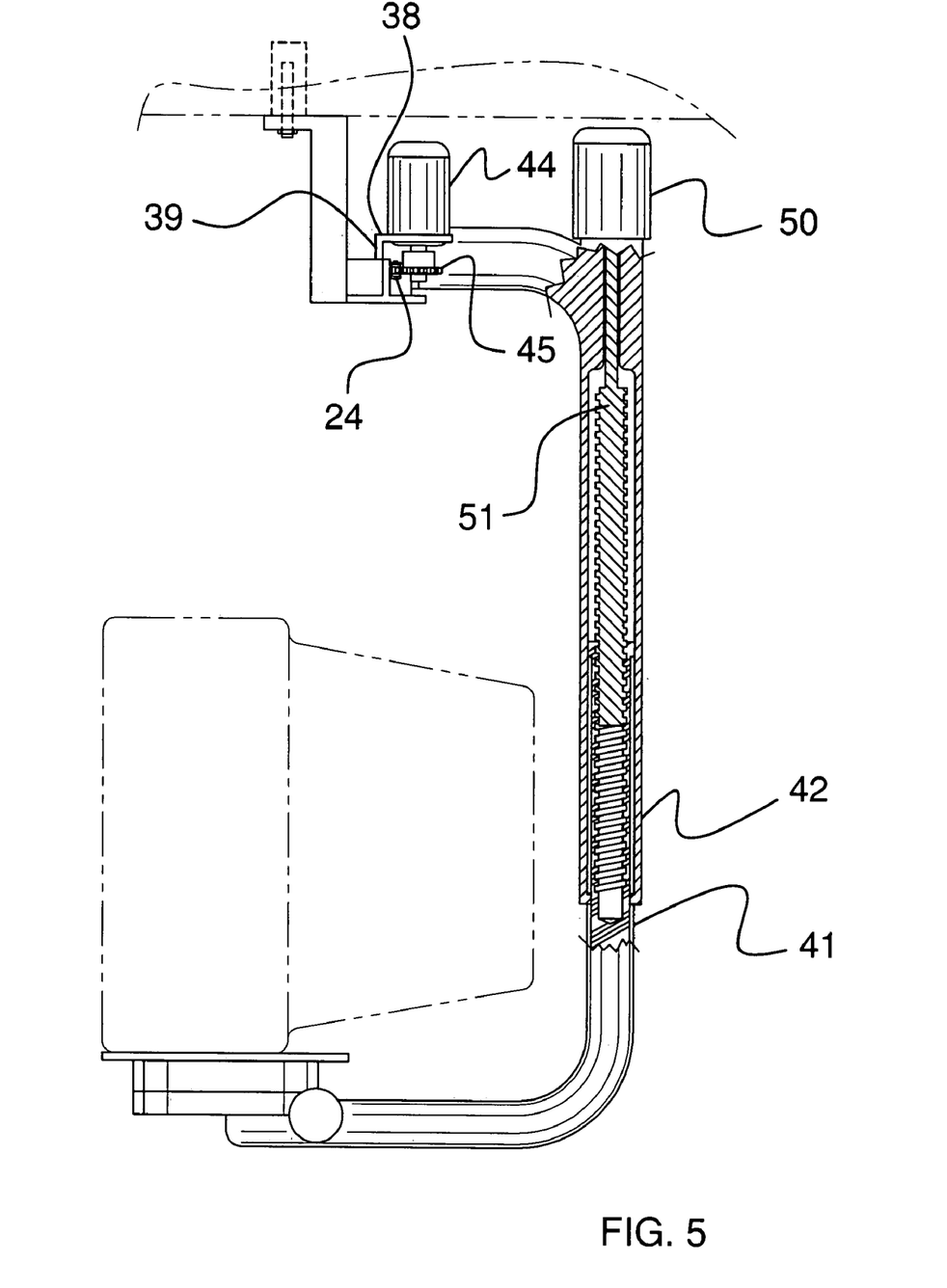
FIG. 5 is a broken side view of the present invention.
Figure 6:
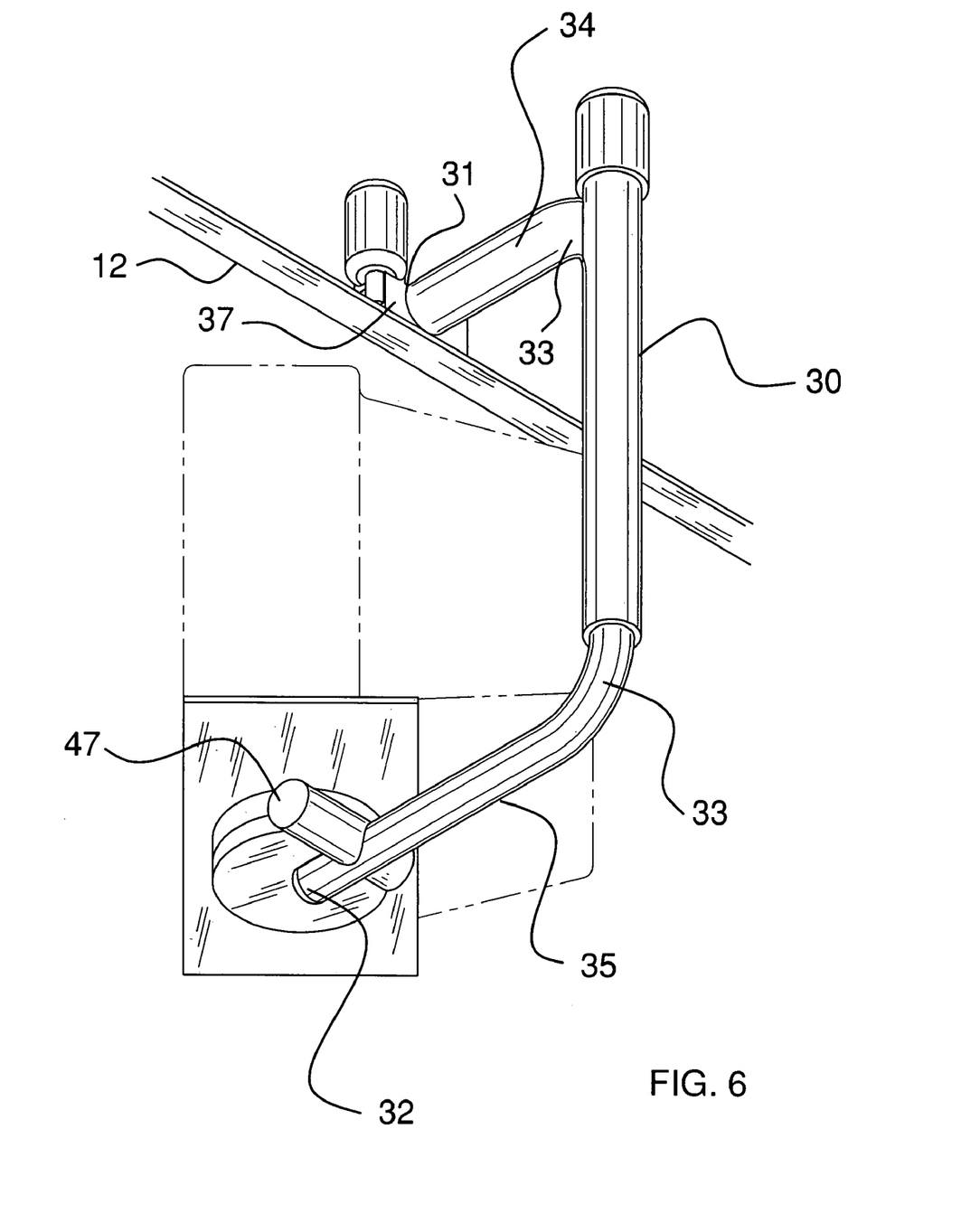
FIG. 6 is a rear perspective view of the present invention.
Figure 7:
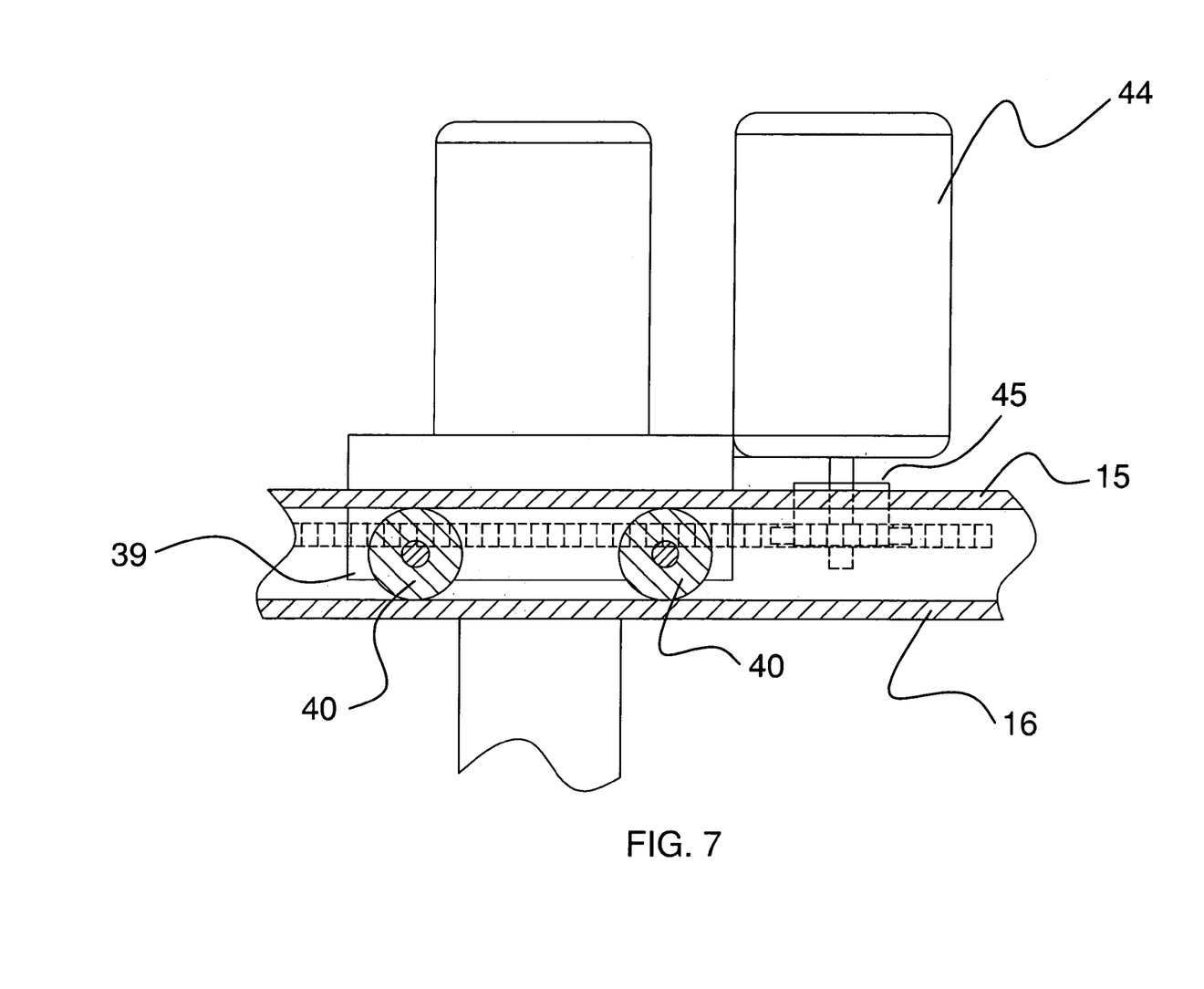
FIG. 7 is a cross-sectional view taken along line 7-7 of FIG. 2 of the present invention.
Figure 8:
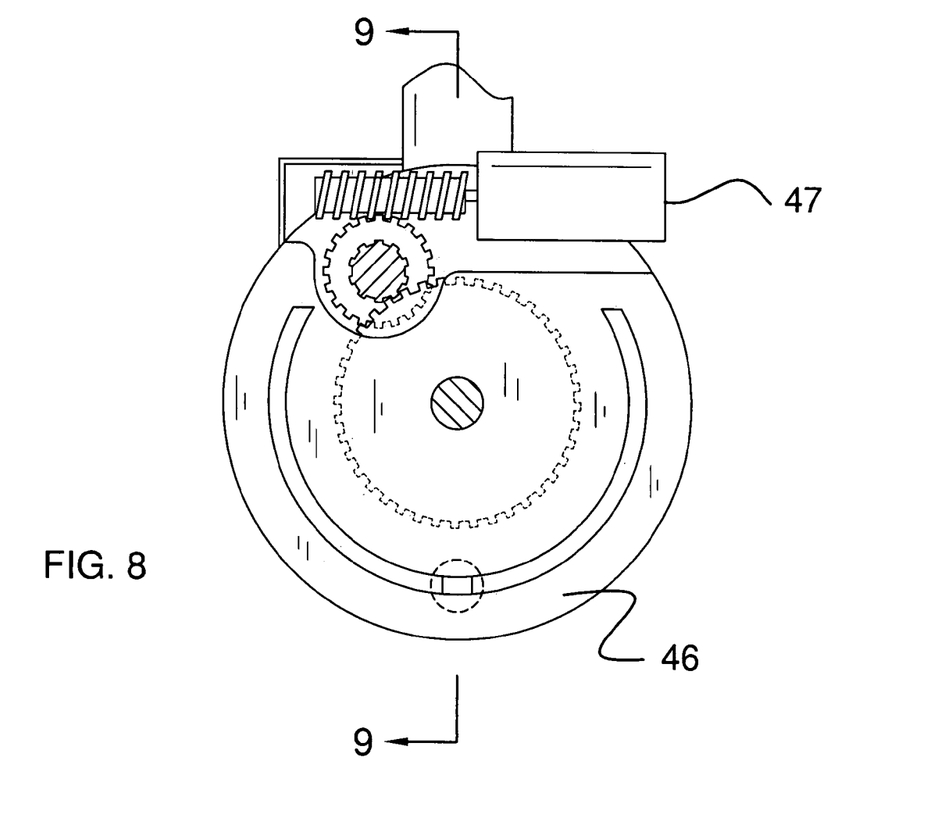
FIG. 8 is a cross-sectional view taken along line 8-8 of FIG. 3 of the present invention.
Figure 9:
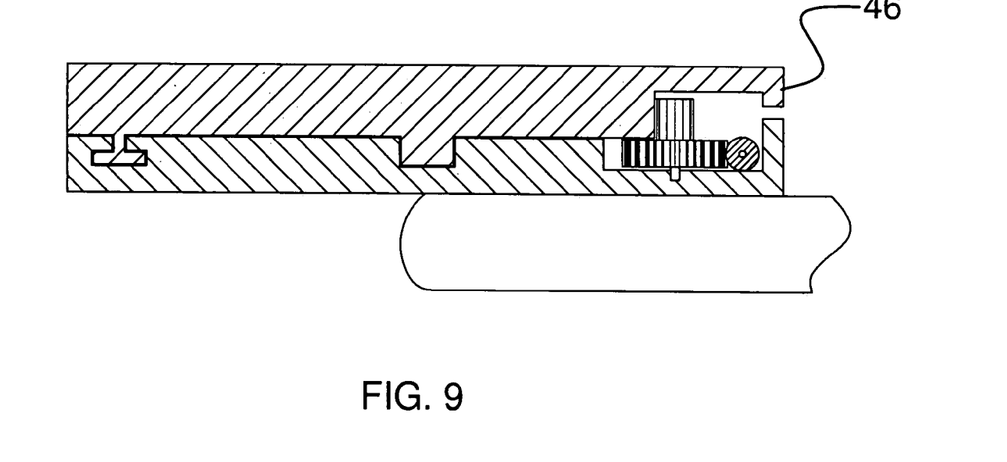
FIG. 9 is a cross-sectional view taken along line 9-9 of FIG. 8 of the present invention.
Figure 10:
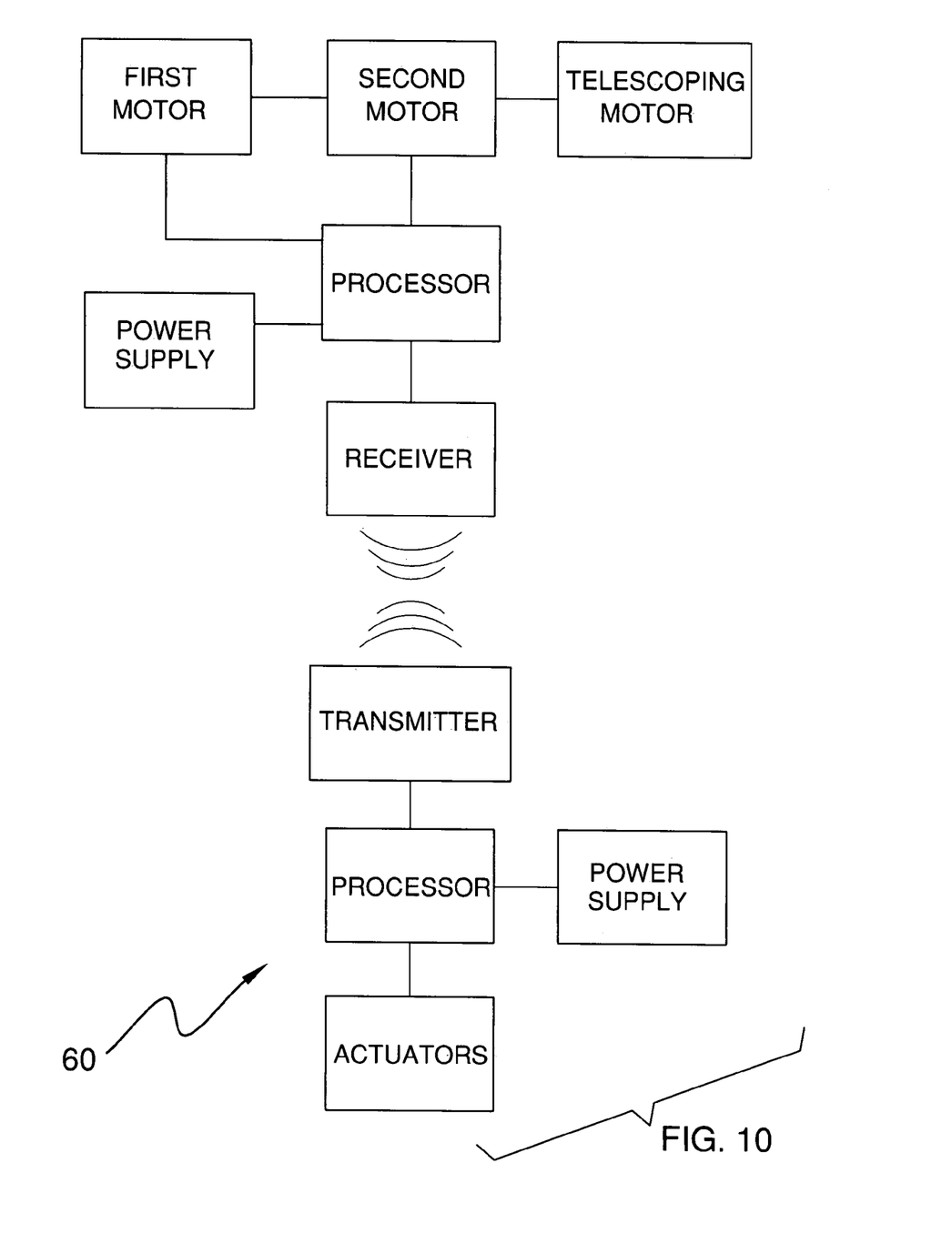
FIG. 10 is an electronic schematic view of the present invention.

In use, the railing 12 is attached to a ceiling with the brackets 25 as shown in FIG. 1. The television 8 is then positioned on the panel 46. The first motor 44 moves the television 8 along the railing 12 while the second motor 47 allows a person to rotate the television 8. The telescoping motor 50 selectively lifts or lowers the television 8 with respect to the railing 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A television mounting and positioning system, said system comprising:
    an elongated railing having a first end and second end, said railing including a tube having a top wall, a bottom wall, a first side wall and second side wall, said top wall having a slot therein extending along a length thereof, said railing having at least one bend therein, a track being attached to and extending along a length of said first side wall;
    a plurality of brackets, each of said brackets being attached to said railing and extending upwardly therefrom, each of said brackets being attached to a ceiling;
    a pole having a top end and a bottom end, said pole having a pair of bends therein such that said pole includes a first arm, a second arm and a middle section extending between said first and second arms, said first and second arms extending in a same direction with respect to each other, a mounting being attached to said top end, said mounting having a bend therein and a leg is defined extending downwardly from a horizontal portion of said mounting, said leg extending through said slot, a wheel being rotatably mounted to said leg and being positioned within said tube, said wheel being rotatable along said bottom and top walls;
    a first motor being mounted on said pole adjacent to said top end, a drive wheel being mechanically coupled to said first motor, said drive wheel being in communication with said railing, said first motor being configured to selectively rotate said drive wheel in a first direction or a second direction such that said top end of said pole is moved along said railing.

2. The system according to claim 1, wherein said middle section being selectively telescoping and including a inner portion being selectively movable inwardly or outwardly from an outer portion.

3. The system according to claim 1, further including:
    a panel being rotatably mounted on said second arm adjacent to said bottom end, said panel being horizontally orientated and having a television positioned thereon; and
    a second motor being mounted on said pole adjacent to said bottom end, said second motor being mechanically coupled to said panel, said second motor being configured to selectively rotate said panel in a first direction or a second direction.

4. The system according to claim 2, a telescoping motor being mounted on said pole and being positioned on an end of said middle section, a rod being coupled to said telescoping motor and being threadably coupled to said inner portion, said telescoping motor being configured to selectively rotate said rod such that said inner portion is selectively moved upwardly or downwardly with respect to said outer portion.

5. The system according to claim 1, a control being configured to selectively turn on said first motor in a first direction or a second direction.

6. The system according to claim 5, said control being a wireless control.

7. A television mounting and positioning system, said system comprising:
    an elongated railing having a first end and second end, said railing including a tube having a top wall, a bottom wall, a first side wall and second side wall, said top wall having a slot therein extending along a length thereof, a flange being attached to and extending along and outwardly from said first side wall, said railing having at least one bend therein, a track being attached to and extending along a length of said first side wall;
    a plurality of brackets, each of said brackets being attached to said railing and extending upwardly therefrom, each of said brackets being attached to a ceiling;
    a pole having a top end and a bottom end, said pole having a pair of bends therein such that said pole includes a first arm, a second arm and a middle section extending between said first and second arms, said first and second arms extending in a same direction with respect to each other, a mounting being attached to said top end, said mounting having a bend therein and a leg is defined extending downwardly from a horizontal portion of said mounting, said leg extending through said slot, a wheel being rotatably mounted to said leg and being positioned within said tube, said wheel being rotatable along said bottom and top walls, said middle section being selectively telescoping and including a inner portion being selectively movable inwardly or outwardly from an outer portion;
    a first motor being mounted on said pole adjacent to said top end, a drive wheel being mechanically coupled to said first motor, said drive wheel being in communication with said railing, said first motor being configured to selectively rotate said drive wheel in a first direction or a second direction such that said top end of said pole is moved along said railing;

a panel being rotatably mounted on said second arm adjacent to said bottom end, said panel being horizontally orientated and having a television positioned thereon;

a second motor being mounted on said pole adjacent to said bottom end, said second motor being mechanically coupled to said panel, said second motor being configured to selectively rotate said panel in a first direction or a second direction;

a telescoping motor being mounted on said pole and being positioned on an end of said middle section, a rod being coupled to said telescoping motor and being threadably coupled to said inner portion, said telescoping motor being configured to selectively rotate said rod such that said inner portion is selectively moved upwardly or downwardly with respect to said outer portion; and a control being configured to selectively turn on each of said first, second and telescoping motors in a first direction or a second direction, said control being a wireless control.

* * * * *